United States Patent [19]

Kime

[11] 4,276,463

[45] Jun. 30, 1981

[54] LASER POWERED SOLID FUEL DISINTEGRATOR

[76] Inventor: Wellesley R. Kime, 8745 Appian Way, Los Angeles, Calif. 90046

[21] Appl. No.: 48,469

[22] Filed: Jun. 14, 1979

[51] Int. Cl.$^3$ .................. B23K 26/14; B02C 19/18; B02C 23/24
[52] U.S. Cl. .................. 219/121 LB; 219/121 L; 219/121 FS; 241/1; 241/33; 241/97
[58] Field of Search ..... 219/121 L, 121 LA, 121 LB, 219/121 FS, 121 LM; 241/1, 33, 97

[56] References Cited

U.S. PATENT DOCUMENTS

| 2,109,449 | 3/1938 | Harman | 241/33 X |
|---|---|---|---|
| 3,043,525 | 7/1962 | Gilbert | 241/33 X |
| 3,078,048 | 2/1963 | Russell et al. | 241/33 X |
| 3,493,060 | 2/1970 | Van Dyk | 219/121 FS X |
| 3,524,046 | 8/1970 | Brouwer | 219/121 LA X |
| 3,980,241 | 9/1976 | Van Nocker | 241/33 X |
| 3,991,943 | 11/1976 | Rohrbach | 241/1 |
| 4,042,334 | 8/1977 | Matovich | 219/121 L X |
| 4,128,753 | 12/1978 | Sharp | 219/121 LC |
| 4,177,950 | 12/1979 | Smith | 241/33 X |

*Primary Examiner*—Elliot Goldberg
*Assistant Examiner*—Keith E. George

[57] ABSTRACT

A solid fuel laser disintegrator for the disintegration of solid fuel particles by laser beams in an environment consisting of a gaseous substance with insufficient oxygen to support combustion, typically principally nitrogen. The disintegration of fuel particles results in the production of minute flammable particles which disperse in nitrogen forming a flammable gaseous mixture. The device provides means for controlling the ratio of nitrogen and minute flammable particles dispersed in nitrogen. Optional means are provided for controlled mixing of oxygen with the mixture of nitrogen and minute flammable particles. The device is typically used in conjunction with a molecular air separator for separating air into its component parts, oxygen and nitrogen.

14 Claims, 3 Drawing Figures

LASER POWERED SOLID FUEL DISINTEGRATOR

SAFETY FEATURES REQUIRED BY LAW ARE INCORPORATED BY REFERENCE

Laser safety devices and features required by law for the present invention, which are of public record, are hereby incorporated by reference although not specifically set forth in the patent application.

CROSS REFERENCE TO RELATED APPLICATIONS

The subject invention is utilized in conjunction with a Rapid Response Steam Generator, and Heat Generator-Exchanger for Alternate Fuels and Fuel Conservation disclosed in copending U.S. patent applications of same inventor.

BACKGROUND OF THE INVENTION

With the diminishing supply of liquid fossil fuels, it has become necessary to find convenient means for using alternate sources of energy, such as combustible solid fuels.

Laser beams are currently used for machining processes including the cutting, drilling and material removal of essentially any solid substance.

It would be of primary importance to find a safe and feasible means of harnessing the disintegrating potential of laser beams for the transformation of solid fuel particles into a flammable gaseous substance.

SUMMARY OF THE INVENTION

As used in this description and the appended claims, the term "nitrogen" refers to an "inert gaseous substance" which will not support combustion and which typically is comprised essentially of nitrogen.

As used in this description and the appended claims, the term "disintegration fuel" refers to the products of laser disintegration of solid fuels.

As used in this description and the appended claims, the term "fuel mixture" refers to a mixture of "nitrogen" and "disintegration fuel."

The invention provides a laser disintegrator for solid fuels and optional control means.

An object of the invention is to provide a means for laser disintegration of fuel particles and the formation of disintegration fuel. A laser disintegrator is utilized, comprising a housing, closed to the atmosphere, in which solid fuel particles are maintained at a constant level for controlled disintegration by laser beams supplied by a laser generator. A fuel supply feed assembly is used, as for example a worm screw assembly, controlled by a detecting device (as for example an "electric eye") for maintaining a constant height of fuel in the housing. The height of fuel is such that disintegrating laser beams do not pass through the entire height of the fuel particles.

An object of the invention is to negate fire and explosion hazards by disintegrating the fuel particles in an environment with insufficient oxygen to support combustion. Typically a gaseous substance containing principally nitrogen is used to flush out oxygen from the interior of the disintegrator, and may additionally be used as a vehicle for the dispersion of disintegrated solid fuel particles.

Accordingly, the invention is typically used in conjunction with a molecular separator which separates air into its constituent parts, oxygen and nitrogen. (Any suitable molecular separator may be used, as for example a centrifugal type or a type utilizing a molecular sieve.) The products of laser disintegration are of such minute size (disintegration fuel) that they disperse with nitrogen forming a flammable gaseous fuel mixture ("fuel mixture"). Typically the fuel mixture is later combined with oxygen from the molecular separator for maximum heat energy production.

Another object of the invention is to maintain contact of the laser beams with only fuel particles during the disintegration process. (That is, to avoid contact of laser beams with metal parts of the disintegrator.) This is accomplished by eliminating "holes" or "voids" in the fuel particles as disintegration is continued. Either the laser beam is oscillated so as to strike differing areas of the target fuel particles, or the target fuel is vibrated so that solid fuel particles are shaken into the path of laser disintegration.

Yet another object of the invention is to disipate heat generated by laser disintegration, to avoid over heating of the unit. Heat is transferred by radiation and convection from the outside of the disintegrator to the atmosphere. The fuel mixture is recirculated through the target fuel and the interior of the housing via a recirculating assembly having a tube with peripheral fins to facilitate radiation and convection of heat to the atmosphere. Said recirculating of fuel mixture also facilitates the dispersion of disintegrated fuel particles (disintegration fuel) in nitrogen.

Still another object of the invention is to control the ratio of nitrogen and disintegration fuel resulting from the laser disintegration of solid fuels.

In the event the apparatus is used in conjunction with a laser generator which is not protected against the entry of dust particles, an object of the invention is to prevent dust particles from entering the "beam aperture" of the laser generator. A means of accomplishing this purpose is to admit dust free nitrogen into the disintegrator so as to flow with the laser beam through a "dust barrier passage." The "dust barrier passage" is occluded when dust free nitrogen is not flowing through it. The laser generator is not activated when the dust barrier passage is occluded.

A still further object of the invention is to provide means, if desired, for varying the rate of fuel consumption and/or controlling the ratio of fuel and oxygen supplied to the device utilizing the disintegration fuel or fuel mixture. This may be accomplished, as for example, by the use of a rotary metering device for metering the flow of oxygen through the apparatus; the rotary metering device being synchronized with a pulse generator which in turn is electrically connected to a micro-timer; the latter activating the laser beam generator. Thus, the disintegration of solid fuel particles occurs with microtimed bursts of disintegrating laser beams of increasing or decreasing frequency according to the flow of oxygen through the apparatus. The micro-timer and power output of the laser generator are adjusted to compensate for the oxidation requirements of specific fuels utilized and the "purity" of the oxygen used.

The rotary metering device typically comprises a device similar in structure to a gear pump or rotary sliding vein pump, and may be used to measure the volume flow of nitrogen entering the disintegrator or fuel mixture discharged from the disintegrator; and the disintegration of fuel particles may be correlated with the flow of either of the latter two substances. In addition, two rotary metering devices may be used, one for oxygen and nitrogen or oxygen and fuel mixture; the rotary metering devices turning synchronously and controlling the ratio of said substances flowing through the apparatus.

Other means for controlling the flow of nitrogen through the disintegration apparatus and the flow of oxygen through the control unit may be used, as for example, flow restrictors utilizing restricting orifices.

A throttle valve is typically used to control the rate of flow of a mixture of oxygen and fuel mixture to internal combustion engines. Accessory blowers or pumps may be used to increase the force of oxygen and/or nitrogen entering the apparatus and/or fuel mixture and/or oxygen flowing from the apparatus.

Another object of the invention is to provide a solid fuel laser disintegration device of the character described which is easy to operate, economical to manufacture, and simple as regards its construction.

Further objects, features and advantages will become apparent to those skilled in the art from the following description when taken in connection with the attached drawings, in which:

BRIEF DESCRIPTION OF THE PREFERRED EMBODIMENTS

Figure 1:
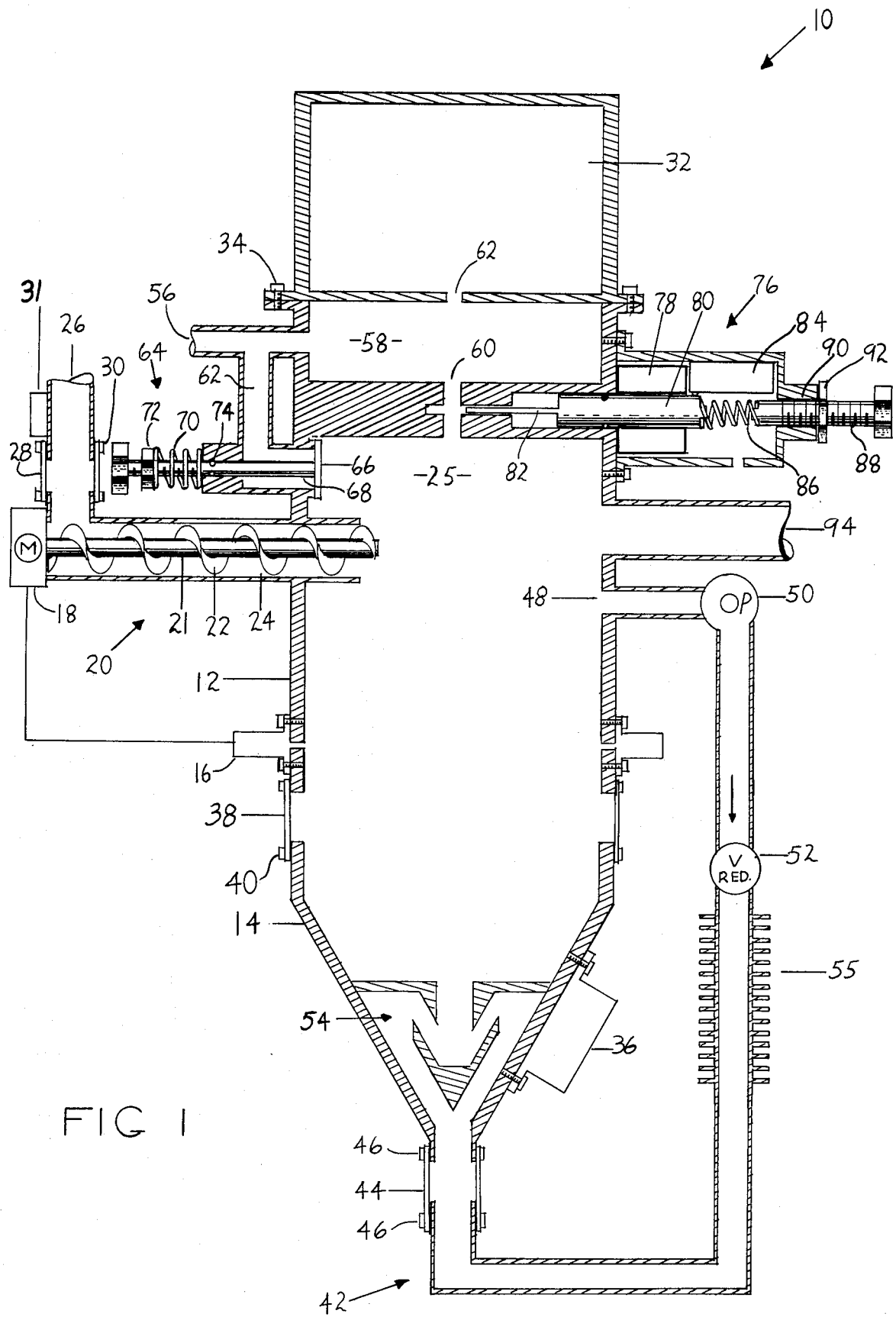
FIG. 1 is a plan view in cross-section of the solid fuel laser disintegrator embodying the present invention.

Referring now to the drawings in which like reference numerals index like parts and with attention initially directed to FIG. 1, there is shown a laser powered solid fuel disintegrator referenced generally by the numeral 10, and constructed in accordance with the invention.

Disintegrator 10 is seen to comprise a housing 12 with a lower funnel shaped portion 14 for holding target fuel particles. The particles are maintained at the level of detecting device assembly 16 which in this instance comprises a light emitting source and a light detecting source disposed on opposite walls of the housing. Light emitted by the light emitting source is detected by the detecting source unless the light is blocked by the presence of solid fuel particles at the level of the detecting device. Detecting device 16 is electrically connected to motor 18 of solid fuel feed assembly 20, so that when light is detected by the detecting unit, motor 18 is activated and rotates shaft 21 and attached worm screw 22, thereby moving solid fuel particles through feed tube 24 and discharging the particles in the interior 25 of housing 12. Solid fuel particles enter the feed assembly 20 through supply tube 26. The latter is connected to the feed assembly by flexible connection 28 held in place by "o-clamps" 30. The supply tube 26 is provided with vibrating unit 31 to shake particles loose which may have a tendency to adhere to the wall of the supply tube. Flexible connector 28 is typically composed of a rubber compound, and is used to facilitate vibration of supply tube 26 by vibrating unit 31.

Target fuel in the essentially funnel shaped lower portion 14 of housing 12, is disintegrated by laser beams emitted from laser beam generator 32, the latter being attached to the upper portion of the housing by bolts 34. The disintegrating beam rapidly produces a "hole" or "void" through which the laser beam passes and penetrates deeper in the target fuel. Lower portion 14 of housing 12 is rapidly shaken by vibrator 36 to shake solid fuel particles into the path of the disintegrating beam and fill the "hole" or "void" being formed. The lower portion 14 of housing 12 is connected above to housing 12 by flexible connection 38 (secured by "o-clamps" 40). Lower portion 14 of housing 12 is connected below to fuel mixture recirculating assembly 42 by flexible connection 44 (secured by "o-clamps" 46). Flexible connections 38 and 44 typically are comprised of a rubber composition and are for the purpose of facilitating movement of lower portion 14 of housing 12.

Fuel mixture passes through opening 48 of housing 12, into recirculating assembly 42, and is moved by centrifugal blower 50 into a downward course. Reducing valve 52 limits the flow of fuel mixture passing through the recirculating assembly 42 so that the target fuel is not subjected to excessive force from the fuel mixture entering lower section 14 of housing 12 via recirculating assembly 42. Particle trap 54 in the interior of lower section 14 of housing 12 prevents fuel particles from dropping further downward while permitting the flow of fuel mixture upward through the particle trap. (Particle trap 54 is optional.)

Heat produced in the target area by laser disintegration of fuels is dissipated to some extent in the fuel mixture which is recirculated through recirculating assembly 42. Recirculating assembly is provided with cooling or heat transfer fins 55 to facilitate transfer of heat to the atmosphere via radiation and convection. Heat is also dissipated by radiation and convection to the atmosphere from the outside of the lower portion 14 of housingg 12.

Dust free nitrogen enters disintegrator 10 through gaseous intake passage 56, and ordinarily flows through dust free area 58 then through the dust barrier passage 60 formed in the housing and preventing the backflow of dust into aperture 62 of laser beam generator 32. Additionally nitrogen may enter the interior 25 of housing 12 via tube 62 and valve assembly 64. Valve assembly 64 is comprised of plate 66 which is secured to shaft 68. The latter is urged backward by spring 70. Tension on spring 70 is adjusted by rotating nut 72 which is meshed with threads on shaft 68. "O-ring" 74 prevents the aberrant flow of gasses into or out of the disintegrator via valve assembly 64.

Dust barrier passage 60 is sealed by solenoid assembly 76. To open the dust free passage, solenoid 78 pulls contained shaft 80 and attached plate 82 to a backward position. When shaft 80 is in a backward position, micro-switch 84 is tripped and current is permitted to flow to the laser beam generator. Shaft 80 is urged forward by spring 86 which moves shaft 80 and attached plate 82 forward when solenoid 78 is deactivated, causing plate 82 to close dust barrier passage 60. The tension on spring 86 may be adjusted by rotating bolt 88 which is threadably received in the solenoid assembly housing 90. Turning bolt 88 is held in place by lock nut 92.

Disintegrator 10, as described, utilizes nitrogen to replace oxygen and as a dispersion medium for disintegration fuel; fuel mixture is discharged from disintegrator 10 through discharge outlet 94.

Figure 2:
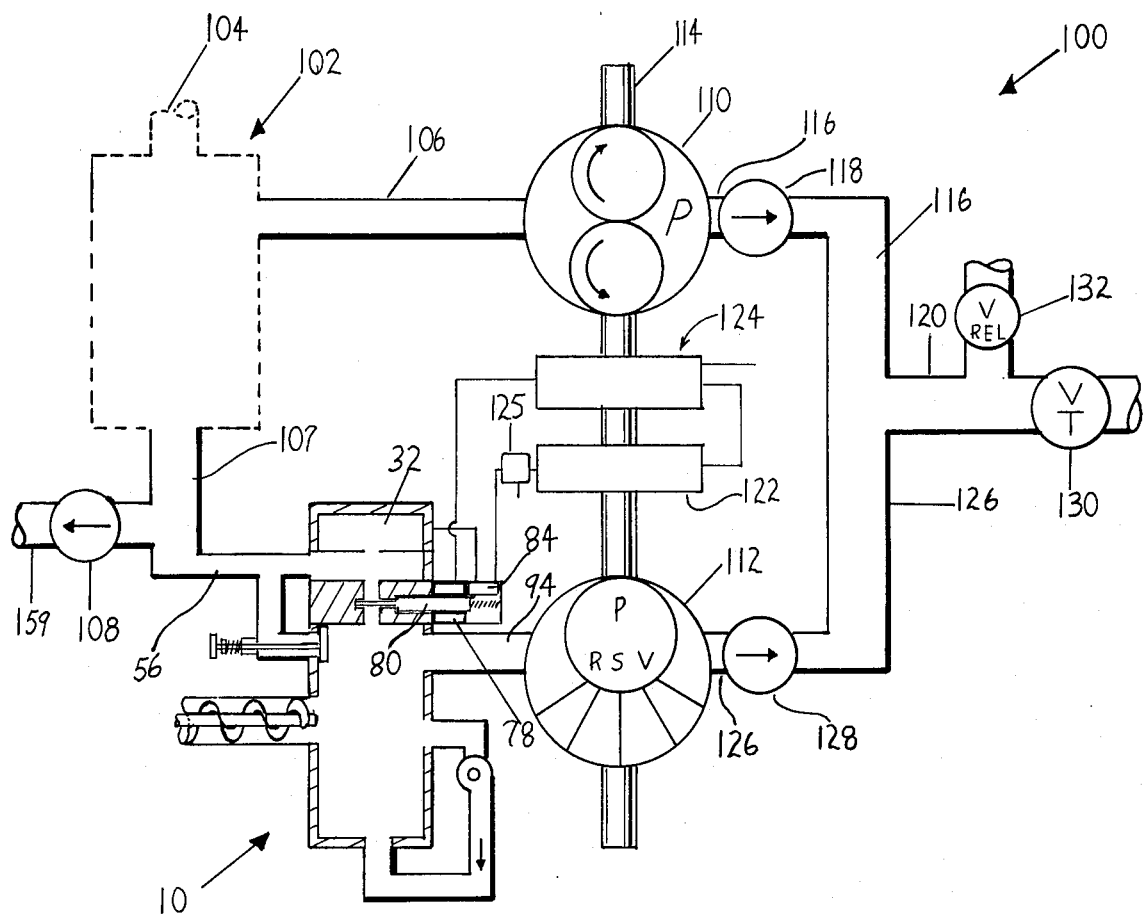
FIG. 2, is a diagrammatic representation of the laser powered solid fuel disintegrator with a control unit embodying the present invention for maintaining a constant ratio of oxygen and fuel mixture with varying outputs of the combined mixture.

FIG. 2, shows a diagrammatic representation of disintegrator 10 used in conjunction with control unit 100 which is constructed according to the invention for providing a constant ratio of oxygen, nitrogen and disintegration fuel with varying outputs of the total mixture. A molecular air separator is indexed by dashed lines 102 and is typically used in conjunction with the laser powered solid fuel disintegrator.

Air enters the air separator through inlet 104, and is separated into its constituent parts, nitrogen and oxygen. Oxygen is discharged into tube 106 and nitrogen is discharged into tube 107. More oxygen than nitrogen is utilized by the disintegrator whereas more nitrogen than oxygen is supplied by the separator. Accordingly, some of the nitrogen is discharged into the atmosphere via check valve 108 and discharge tube 159. Oxygen flowing through tube 106 passes through rotary metering device 110 which in this instance is shown as similar in construction to a gear pump, however any suitable metering device may be used as for example a metering device such as metering device 112 which is similar in construction to a rotary sliding vein pump. As oxygen flows through metering device 110, shaft 114 is rotated. Oxygen then flows through check valve 118 and into mixing tube 120 where the oxygen is combined with fuel mixture. Pulse generator 122 and movement activated switch 124 are synchronized with (attached to) shaft 114. Rotation of shaft 114 causes activation of movement activated switch 124 to the "on" position. Said switch is electrically connected to solenoid 78 and current flows to solenoid 78. Solenoid 78 is thereby activated to cause shaft 80 to retract to a backward position. The backward position of shaft 80 triggers micro-switch 84 to the "on" position.

Movement activated switch 124 is also electrically connected to pulse generator 122 and movement of shaft 114 causes current to flow from movement activated switch 124 to pulse generator 122. Pulse generator 122 is electrically connected to micro-timer 125, which in turn is electrically connected to the laser beam generator 32 via micro-switch 84. Current flowing from the movement activated switch 124 and pulse generator 122 is in pulsations corresponding to the rate of speed of rotation of shaft 114. Said pulsations activate micro-timer 125 to transfer timed electrical discharges through micro-switch 84 to laser beam generator 32. The latter produces disintegrating bursts of laser beams which strike the target fuel producing disintegration fuel. Nitrogen flowing through tube 56 flows into the disintegrator and mixes with disintegration fuel forming fuel mixture. Fuel mixture is discharged through outlet 94 and enters rotary metering device 112 which is shown as similar in construction to a rotary sliding vein pump, however it may be of any suitable type as for example, similar to a rotary gear pump design, indexed by numeral 110.

Fuel mixture flows from rotary metering device 112 into discharge tube 126, through check valve 128 (which prohibits backflow) and into mixture tube 120 where it is combined with oxygen. The volume flow of the total mixture discharged from the device is controlled by throttle valve 130. Pressure release valve 132 protects the apparatus from excessive pressure in the event of flash combustion or explosion in mixing tube 120.

Pulse generator 122 typically provides one electrical pulse per rotation of shaft 114, however a pulse generator producing more than one pulse per rotation of said shaft may be used. Micro-timer 125 is adjustable as to the length of time of each discharge therefrom.

It is apparent that if oxygen is not passed through control unit 100, pulse generator 122 and movement activated switch 124 may be synchronized with the flow of fuel mixture passing from disintegrator 10 into rotary metering device 112 or the flow of nitrogen through rotary metering device 112 which in the latter event would be located so as to detect the flow of nitrogen through tube 56 into disintegrator 10.

Movement of shaft 114 is taken to indicate that dust free nitrogen is flowing into disintegrator 10 and fuel mixture is flowing out of disintegrator 10 and through rotary metering device 112. Solenoid 78, when activated by current flowing through movement activated switch 124, moves shaft 80 and attached plate 82 to a backward position thereby opening dust barrier passage 60. Spring 68 urges shaft 80 to a forward position and moves said shaft accordingly when current no longer flows from movement activated switch 124 to solenoid 78, thereby closing dust barrier passage 60.

Figure 3:
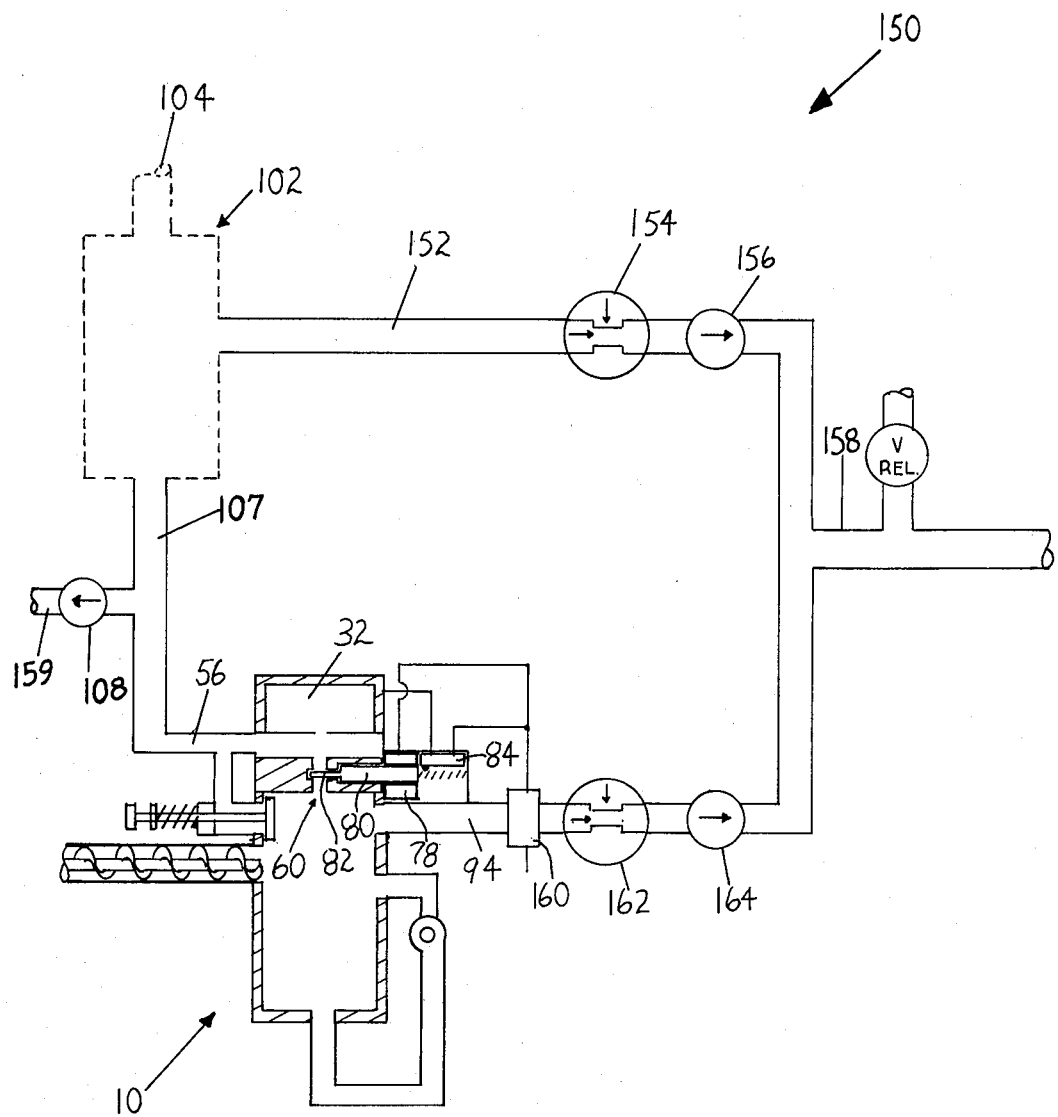
FIG. 3, is a diagrammatic representation of the laser powered solid fuel disintegrator with a control unit embodying the present invention for maintaining a constant ratio of oxygen and fuel mixture with a constant output of the combined mixture.

FIG. 3, shows a diagramatic representation of disintegrator 10 used in conjunction with control unit 150 which is constructed in accordance with the invention for providing a constant ratio of oxygen, nitrogen and disintegration fuel with a predetermined, constant output of a total mixture.

Oxygen discharged from molecular air separator 102 enters tube 152, and passes through flow resistor 154 (which is of a variable resistance type, adjusted to a predetermined fixed resistance to permit a predetermined volume flow of oxygen through said flow restrictor.) The oxygen then passes through check valve 156 (which prevents backflow) and to mixing tube 158 where it is combined with fuel mixture.

Nitrogen from separator 102 flows through tube 108 and into intake tube 56 of disintegrator 10. Excess nitrogen is again discharged through check valve 108 and discharge tube 159. Fuel mixture flowing through discharge tube 94 of disintegrator 10 activates flow detecting switch 160 which is electrically connected to solenoid 78 of disintegrator 10, and the laser beam generator 32 via micro-switch 84. Current flowing through flow detecting switch 160 activates solenoid 78 to draw shaft 80 and attached plate 82 in a backward position thereby opening dust barrier passage 60 and activating micro-switch 84 to the "on" position. Current flowing through flow detecting switch 160 also flows through micro-switch 84 (now in the "on" position) and then to laser beam generator 32. Disintegrating laser beams are produced which strike and disintegrate target fuel in the lower portion of the housing, forming disintegration fuel. Disintegration fuel is mixed with nitrogen entering the disintegrator 10, forming fuel mixture which is discharged through outlet 94. The disintegration fuel passes through flow resistor 162 (which is of variable resistance type, adjusted to a predetermined fixed resistance to permit a predetermined volume flow of fuel mixture through said flow restrictor). The fuel mixture then passes through check valve 164 (which prevents backflow) and into mixing tube 158 where it is mixed with oxygen.

Referring back to FIG. 2, rotary metering devices 110 and 112 preferably should be comprisesd of materials which do not require oil for lubrication as oil when combined with oxygen may present a fire and explosion hazard.

Various additional modifications and extensions of this invention will become apparent to those skilled in the art. All such variations and deviations which basically rely on the teachings through which this invention has advanced the art are properly considered to be within the spirit and scope of the invention.

What is claimed:

1. A laser powered solid fuel disintegrator having a housing closed to the atmosphere, means for the intake of solid fuel particles into the housing, means for replacing oxygen from the interior of the housing by replacing the oxygen with a gaseous substance comprising essentially nitrogen, means for applying laser beams to the solid fuel particles for disintegration of the fuel particles and production of disintegration fuel, means for discharging a mixture of disintegration fuel and nitrogen from the housing, further comprising:

a control unit for controlling the rate of disintegration of the solid fuel particles by the laser beams, the control unit having means for passing the fuel mixture through the control unit and controlling the rate of disintegration of solid fuel particles by the laser beams with respect to the volume flow of the fuel mixture passed through the control unit.

2. The disintegrator defined in claim 1, wherein the means for passing the fuel mixture through the control unit and controlling the rate of disintegration of solid fuel particles comprises:

a gaseous flow measuring device similar in structure to a rotary sliding vane pump.

3. The disintegrator as defined in claim 1, wherein the means for passing the fuel mixture through the control unit and controlling the rate of disintegration of solid fuel particles comprises:

a measuring device similar in structure to a gear pump.

4. The disintegrator as defined in claim 1, wherein the means for passing the fuel mixture through the control unit and controlling the rate of disintegration of the fuel particles comprises:

(A) means for measuring the volume flow of fuel mixture passing through the control unit;
(B) a pulse generator synchronized to the means for measuring the volume flow of fuel mixture passing through the control unit;
a micro-timer, electrically connected to the pulse generator and to the means for applying laser beams, for activating the means for applying laser beams in timed bursts of disintegrating beams, the frequency of the timed bursts being in relation to the volume flow of fuel mixture flowing through the control unit.

5. The disintegrator defined in claim 1, further comprising:

means for passing oxygen through the control unit;
means for controlling the rate of oxygen passing through the control unit with respect to the rate of fuel mixture flowing through the control unit, for providing a flammable mixture with the optimum ratio of oxygen and fuel mixture.

6. A laser powered solid fuel disintegrator having a housing closed to the atmosphere, means for the intake of solid fuel particles into the housing, means for replacing oxygen from the interior of the housing by replacing oxygen with a gaseous substance comprising essentially nitrogen, means for applying laser beams to the solid fuel particles for disintegrating the solid fuel particles and producing disintegration fuel, means for discharging a mixture of disintegration fuel and nitrogen from the housing, further comprising:

a control unit for controlling the rate of disintegration of solid fuel particles by laser beams, the control unit having means for passing the nitrogen through the control unit and controlling the rate of disintegration of solid fuel particles by laser beams with respect to the volume flow of nitrogen passing through the control unit.

7. The disintegrator defined in claim 6, wherein the means for passing nitrogen through the control unit and controlling the rate of disintegration of solid fuel particles by laser beams with respect to the volume flow of nitrogen passing through the control unit comprises: a metering device similar in structure to a gear pump.

8. The disintegrator as defined in claim 6, wherein the means for passing nitrogen through the control unit and controlling the rate of disintegration of solid fuel particles by laser beams with respect to the volume flow of nitrogen passing through the control unit comprises:

a metering device similar in structure to a rotary sliding vane pump.

9. The disintegrator as defined in claim 6, wherein the means for passing nitrogen through the control unit and controlling the rate of disintegration of solid fuel particles by laser beams with respect to the volume flow of nitrogen passing through the control unit comprises:

(A) means for measuring the volume flow of nitrogen flowing through the control unit;
(B) a pulse generator synchronized to the means for measuring the volume flow of nitrogen flowing through the control unit;
(C) a micro-timer, electrically connected to the pulse generator and to the means for applying laser beams for activating the means for applying laser beams to produce timed bursts of disintegrating beams, the frequency of the timed bursts being in relation to the volume flow of nitrogen passing through the control unit.

10. The disintegrator defined in claim 6, wherein the control unit further comprises:

means for passing oxygen through the control unit;
means for controlling the rate of flow of oxygen passing through the control unit with respect to the rate of flow of nitrogen passing through the control unit.

11. A laser powered solid fuel disintegrator having a housing, closed to the atmosphere, means for the intake of solid fuel particles into the housing, means for removing oxygen from the interior of the housing by replacing the oxygen with a gaseous substance consisting of essentially nitrogen, means for applying laser beams to the solid fuel particles for disintegration of the fuel particles and production of disintegration fuel, means for the discharge of disintegration fuel from the housing, further comprising:

a control unit for controlling the rate of disintegration of solid fuel particles by the laser beams, the control unit having means for passing oxygen through the control unit and controlling the rate of disintegration of solid fuel particles by laser beams in relation to the volume of oxygen passing through the control unit.

12. The disintegrator defined in claim 11, wherein the means for passing oxygen through the control unit and controlling the rate of disintegration of solid fuel particles by laser beams comprises:
   a metering device similar in structure to a gear pump.

13. The disintegrator defined in claim 11, wherein the means for passing oxygen through the control unit and controlling the rate of disintegration of solid fuel particles by laser beams comprises:
   a metering device similar in structure to a rotary sliding vane pump.

14. The disintegrator defined in claim 11, wherein the means for passing oxygen through the control unit and controlling the rate of disintegration of solid fuel particles by laser beams comprises:
   means for measuring the volume flow of oxygen;
   a pulse generator synchronized to the means for measuring the volume flow of oxygen;
   a micro-timer, electrically connected to the pulse generator and to the means for applying laser beams for activating the means for applying laser beams in timed bursts of disintegrating beams, the frequency of the timed bursts being in relation to the volume flow of oxygen passing through the control unit.

* * * * *